United States Patent [19]

Scott

[11] Patent Number: 5,641,092
[45] Date of Patent: Jun. 24, 1997

[54] VENDING APPARATUS AND SYSTEM FOR AUTOMATED DISPENSING OF DISKS

[75] Inventor: Ed Scott, Anaheim Hills, Calif.

[73] Assignees: Sony Corporation, Tokyo, Japan; Sony Trans Com Inc., Irvine, Calif.

[21] Appl. No.: 544,830

[22] Filed: Oct. 18, 1995

Related U.S. Application Data

[62] Division of Ser. No. 275,808, Jul. 15, 1994, Pat. No. 5,523,551.

[51] Int. Cl.$^6$ .................................................. B65G 59/00
[52] U.S. Cl. ........................................... 221/134; 221/256
[58] Field of Search .............................. 221/84, 87, 124, 221/256, 257, 266, 268, 7, 2, 3, 15, 134

[56] References Cited

U.S. PATENT DOCUMENTS

| 324,717 | 8/1885 | Meyers | 221/256 |
|---|---|---|---|
| 503,139 | 8/1893 | Hook | 221/257 |
| 1,057,322 | 3/1913 | Bowman | 221/253 |
| 1,702,157 | 2/1929 | Gabutti | 221/256 |
| 2,427,628 | 9/1947 | Silverman | 221/134 |
| 2,522,226 | 9/1950 | Hood | 221/134 |
| 4,677,604 | 6/1987 | Selby, III et al. | 369/33 |
| 4,839,875 | 6/1989 | Kuriyama et al. | 235/381 |
| 4,872,151 | 10/1989 | Smith | 369/33 |
| 4,872,591 | 10/1989 | Konopka | 221/3 |
| 4,884,212 | 11/1989 | Stutsman | 364/479 |
| 4,896,024 | 1/1990 | Morello et al. | 235/381 |
| 5,282,187 | 1/1994 | Lee | 369/52 |
| 5,306,115 | 4/1994 | Montalvo et al. | 414/797.9 |
| 5,330,384 | 7/1994 | Shapley et al. | 453/17 |
| 5,370,495 | 12/1994 | Montalvo et al. | 414/797.9 |
| 5,415,319 | 5/1995 | Risolia | 221/3 |
| 5,445,295 | 8/1995 | Brown | 235/381 |
| 5,455,409 | 10/1995 | Smith et al. | 235/385 |

FOREIGN PATENT DOCUMENTS

| 1137588 | 10/1962 | Germany. |
| 63-116287 | 5/1988 | Japan. |

OTHER PUBLICATIONS

Rhea, J., "Inflight Entertainment Market Driven by Cost Considerations", Avionics, Oct. 1993, pp. 24–27.

*Primary Examiner*—Kenneth Noland
*Attorney, Agent, or Firm*—Limbach & Limbach LLP

[57] ABSTRACT

A vending apparatus and system for storing and automatically dispensing magnetic or optical disks. A user interface means allows a user to enter a dispensing request corresponding to the selection of a desired disk and includes means for receiving user identification information, such as credit or debit card information, or other information stored magnetically on a bank card, driver's license, school identification card, or library card. Once a disk selection has been entered and user identification information received and verified, the selected disk is dispensed from the vending unit. The disks to be dispensed by the vending unit may be provided to have a region of magnetic recording media formed on one surface, and the vending unit may be equipped to write information relevant to the transaction onto the region of magnetic media.

4 Claims, 16 Drawing Sheets

VENDING APPARATUS AND SYSTEM FOR AUTOMATED DISPENSING OF DISKS

This is a continuation divisional of application Ser. No. 08/275,808, filed Jul. 15, 1994 now U.S. Pat. No. 5,523,551.

FIELD OF THE INVENTION

The present invention relates to the field of vending machines and, specifically, to the field of vending machines for automated sale or rental of data storage disks.

BACKGROUND OF THE INVENTION

Disks, particularly compact disks ("CDs"), are a popular medium for storing audio video, multimedia and game data, as well as applications software. Personal computers having compact disk capabilities are being integrated into homes, schools, libraries and businesses. Improvements on the currently available "broom box" type portable stereo devices are presently being developed which include a CD ROM drive and color LCD panel which are capable of playing video, multimedia, games as well as the audio CD disks they currently play. Portable computers including so-called laptops, notebooks, palmtops and personal digital assistants ("PDAs") often make use of disks such as 3.5 inch floppy disks or "minidisks." Moreover, new entertainment systems for multi-passenger vehicles, such as trains and airplanes, are being implemented. Such systems provide each passenger seat with a separate user terminal which may include a video monitor, a headset for audio output, and a CD ROM player. CD ROM disks storing audio data, video data, and/or applications software are made available for separate use at each passenger's user terminal during travel. These new systems allow each passenger to choose from a variety of film, informational videos, music, game software or other interactive software to be used at its individual passenger terminal.

This increase in the number of applications for data storage dish has brought about the need for a mechanism by which the disks may be dispensed automatically for loan, sale or rental. Such a mechanism is particularly desirable for use on multi-passenger vehicles having entertainment systems of the type described above. A mechanism for dispensing disks and collecting payment information or borrower identification information is also desirable for use in libraries, where user identification information must be collected to ensure return of borrowed disks or compensation for unreturned ones.

SUMMARY AND OBJECTS OF THE INVENTION

It is therefore an object of the present invention to provide an apparatus for automated dispensing of data storage disks for sale, rental, or library loan, and a disk adapted to be dispensed by such an apparatus. It is further an object of the present invention to provide an apparatus for dispensing data storage disks and for collecting identification and/or payment information relating to the transaction.

The inventive apparatus for automatically dispensing disks includes a vending unit for storing and dispensing a plurality of disks. The vending unit is equipped with a user interface means which allows a user to enter a select command corresponding to the selection of a desired disk. The user interface means also includes a means for receiving user identification information, such as credit or debit card information, or other information stored magnetically on a bank card, driver's license, school identification card, or library card.

Once a disk selection has been entered and user identification information has been received, the selected disk is dispensed from the vending unit. The optical disks to be dispensed by the vending unit may be provided with a region of magnetic recording medium formed on one surface, and the vending unit may be equipped to write information relevant to the transaction (i.e. the user's name, credit card or library card information, and/or other information such as date and time of rental) onto the magnetic medium.

DETAILED DESCRIPTION OF THE EXEMPLARY EMBODIMENTS

Figure 1:
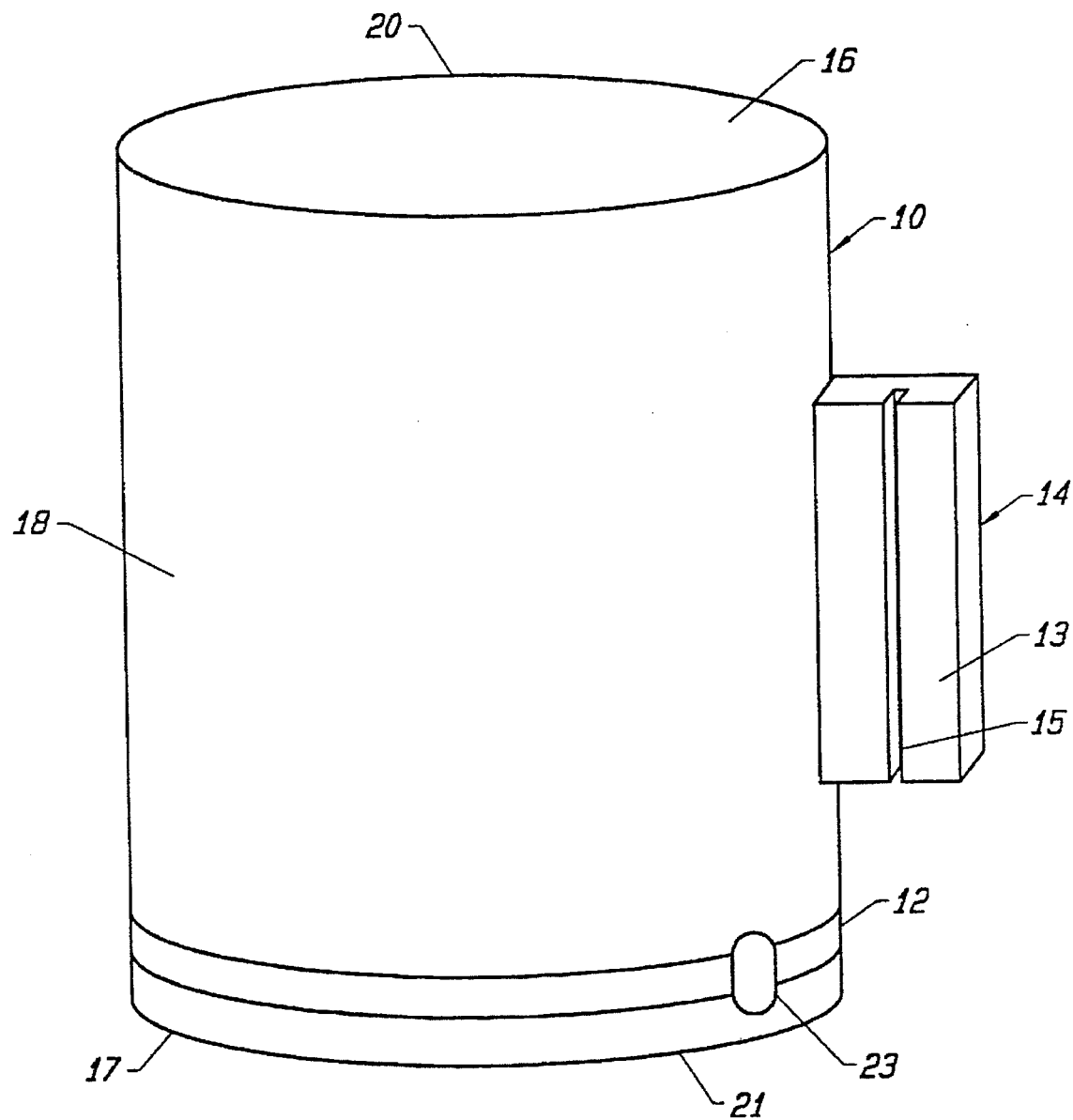
FIG. 1 is a perspective view of a first embodiment of a vending apparatus according to the present invention.

The present invention is a vending machine for use in dispensing data storage disks. Three alternate embodiments will be described: the first two are single-selection units which offer a single type disk selection for sale or rental; the third is a multiple selection unit which offers the user a choice between a number of disk selections and which dispenses a disk of the selected type to the user. Each embodiment is configured to store a number of disks, and each disk is preferably provided with a protective sleeve made of a scratch-free material such as Tyvek material. While these embodiments will be described with reference to compact disks, it should be appreciated that alternative embodiments of the present invention may also be provided for dispensing other types of disks (e.g. floppy disks or magneto-optical disks).

An embodiment of the first type will first be described with reference to FIG. 1. The vending machine is comprised generally of a cylindrical housing 10, a CD dispensing tray 12, and a credit card reader 14. The cylindrical housing 10 is sized to accommodate a stack of disks (not shown). A square housing may alternatively used if, for example, the vending apparatus is to be used to dispense the square-shaped 3.5 inch floppy disks.

The cylindrical housing 10 has top wall 16 and bottom wall 17 which are preferably oriented horizontally, and a substantially vertical, generally cylindrical wall 18 fixed to circular perimeters 20, 21 of the walls 16, 17, respectively. The vertical orientation of the cylinder permits disks within the cylinder to feed, by force of gravity, into the dispensing tray 12 for delivery to a user.

Figure 2A:
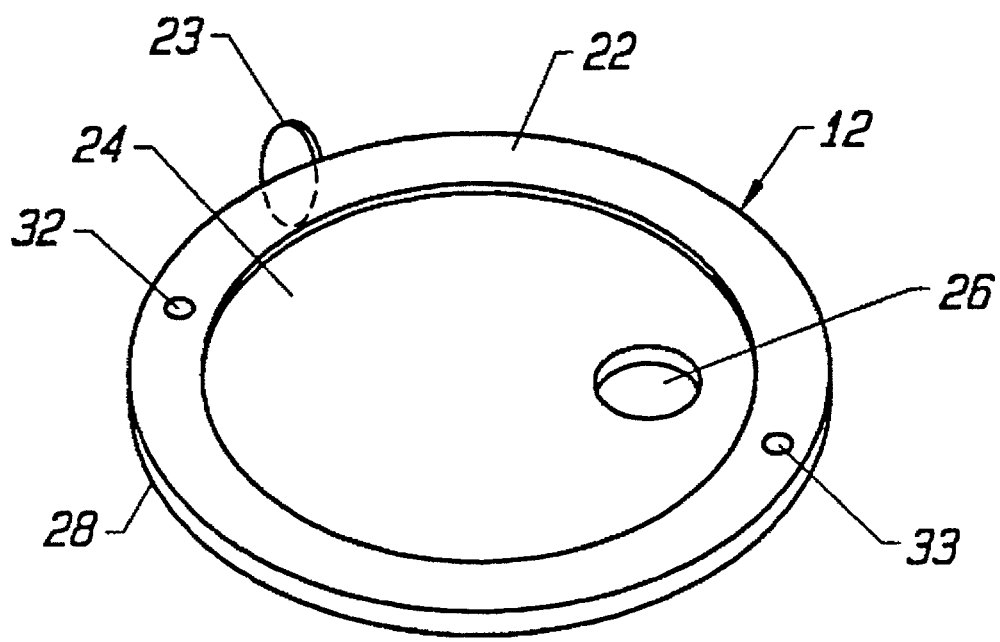
FIGS. 2A and 2B are a perspective view and a side view, respectively, of the dispensing tray of the vending apparatus of FIG. 1.

FIGS. 2A through 4 illustrate the dispensing tray 12 and the mechanism by which it operates. Referring to FIGS. 2A and 2B, the dispensing tray 12 is comprised of a plate 22 defined by a circular perimeter 28 (FIG. 2A) and having a disk-shaped recessed portion 24.

Figure 2B:
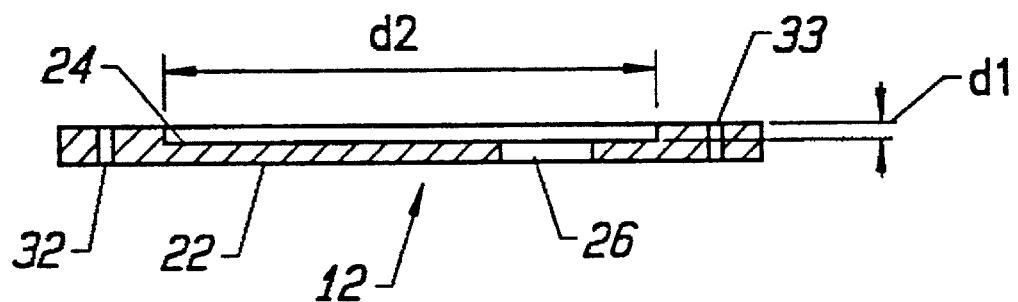

The depth of the recessed portion 24, which is designated d1 in FIG. 2B, and the diameter, which is designated d2, are sized such that a CD with a protective sleeve will fit within the recessed portion 24.

A finger hole 26 passes through the plate 22 at the recessed portion 24. Pin hole 32 passes through plate 22 in a substantially vertical direction. A second substantially vertical pin hole 33 is formed in the plate 22, opposite from the pin hole 32. The tray 12 has a handle 23, which is shown in FIG. 1.

Figure 3A:
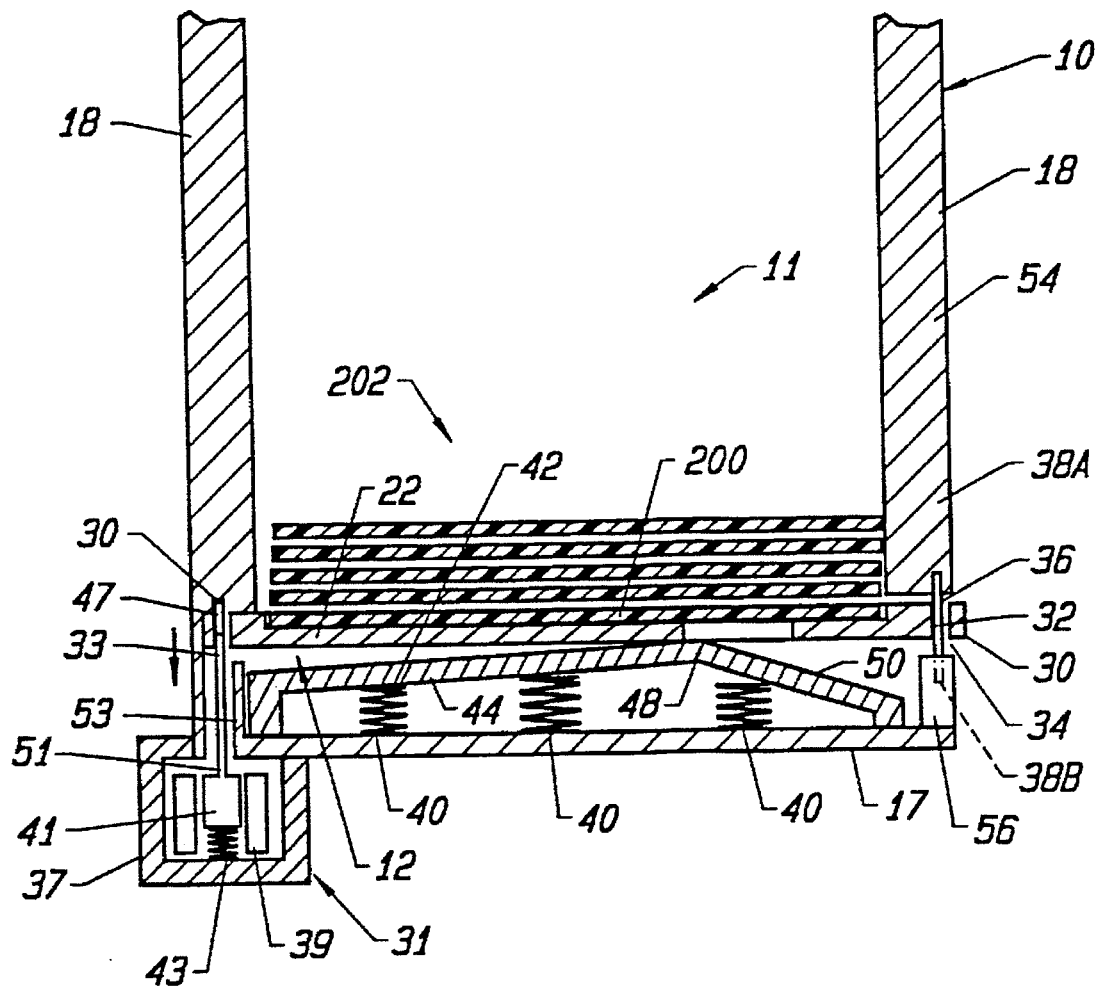
FIGS. 3A and 3B are side section views of the vending apparatus of FIG. 1, showing the dispensing tray in the closed and open positions, respectively.
Figure 3B:
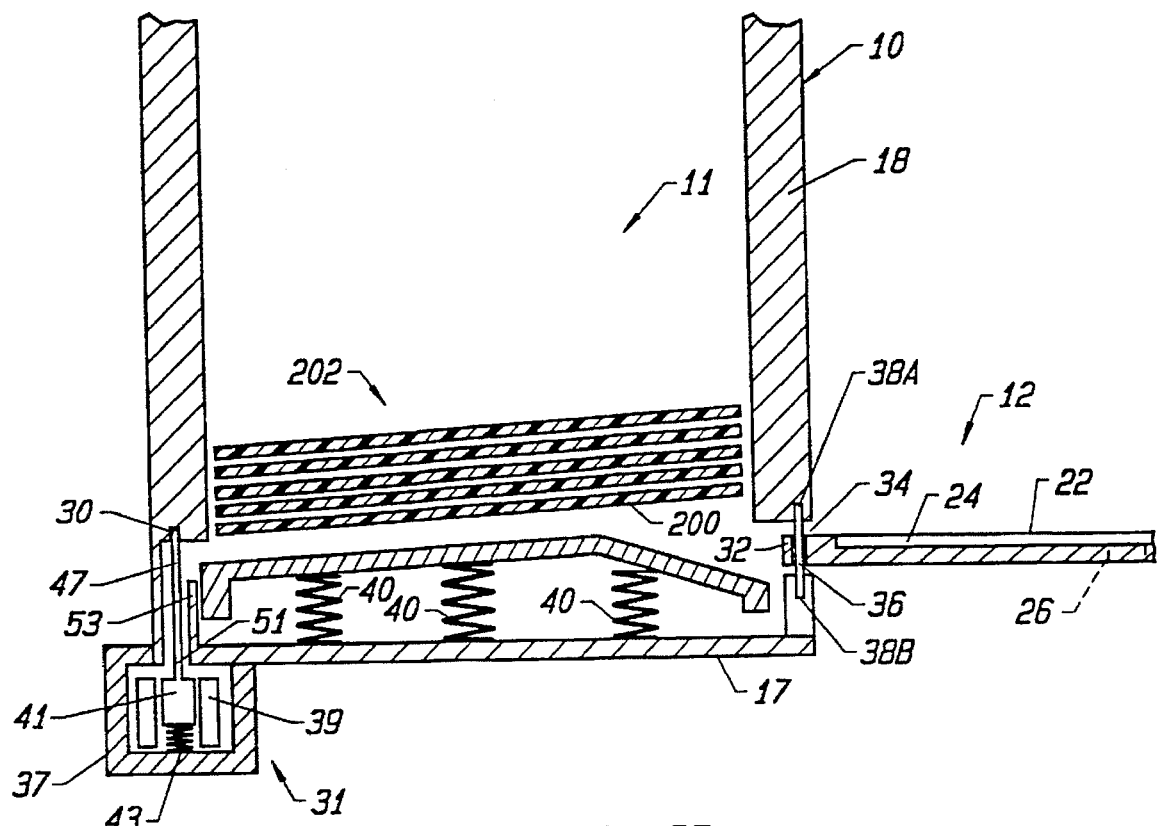

Referring to FIGS. 3A and 3B, a slot 34 is formed in wall 18, near bottom wall 17 of housing 10. The tray 12 is positioned such that pin hole 32 is within the slot 34. A pin 36 extends across the slot in a substantially vertical direction and passes through pin hole 32 (FIG. 2A). Ends 38a, 38b of pin 36 are secured within wall 18 on opposite sides of slot 34. The tray 12 is pivotable around pin 36 between a closed position, shown in FIG. 3A, wherein recessed portion 24 of tray 12 is within interior 11 of cylindrical housing 10, and an open position, shown in FIG. 3B wherein recessed portion 24 of tray 12 is outside housing 10.

Plate 42 above bottom wall 17 (within interior 11 of housing 10) is supported and upwardly biased by springs 40. When tray 12 is in the open position (FIG. 3B), springs 40 overcome the weight of stack 202 of disks against plate 42, to maintain the plate 42 at a height which will hold stack 202 of disks above the slot 34. When the tray 12 is moved to the closed position, shown in FIG. 3A, the tray 12 presses the plate 42 downwardly against the springs. Once the tray 12 has moved to the fully closed position, the bottom most disk, designated 200, feeds downwardly into the recessed portion 24 of the tray.

Figure 4:
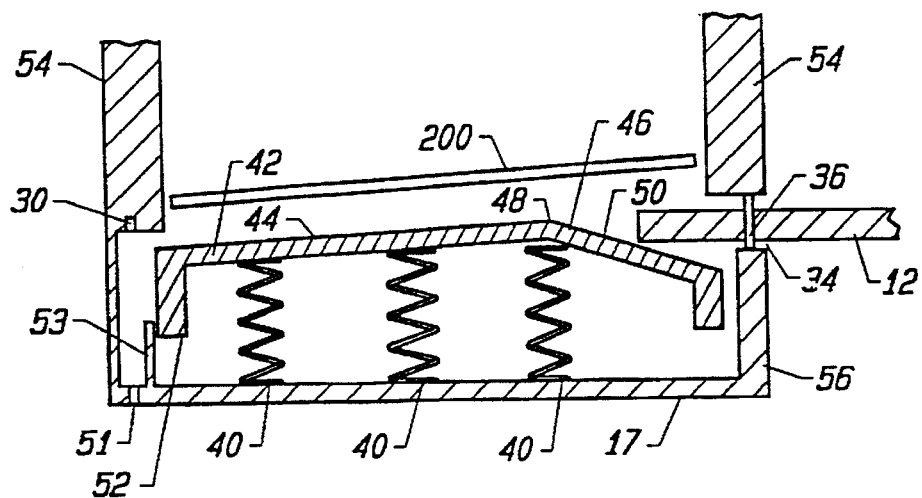
FIG. 4 is a magnified partial side section view of the vending apparatus of FIG. 1.
Figure 5:
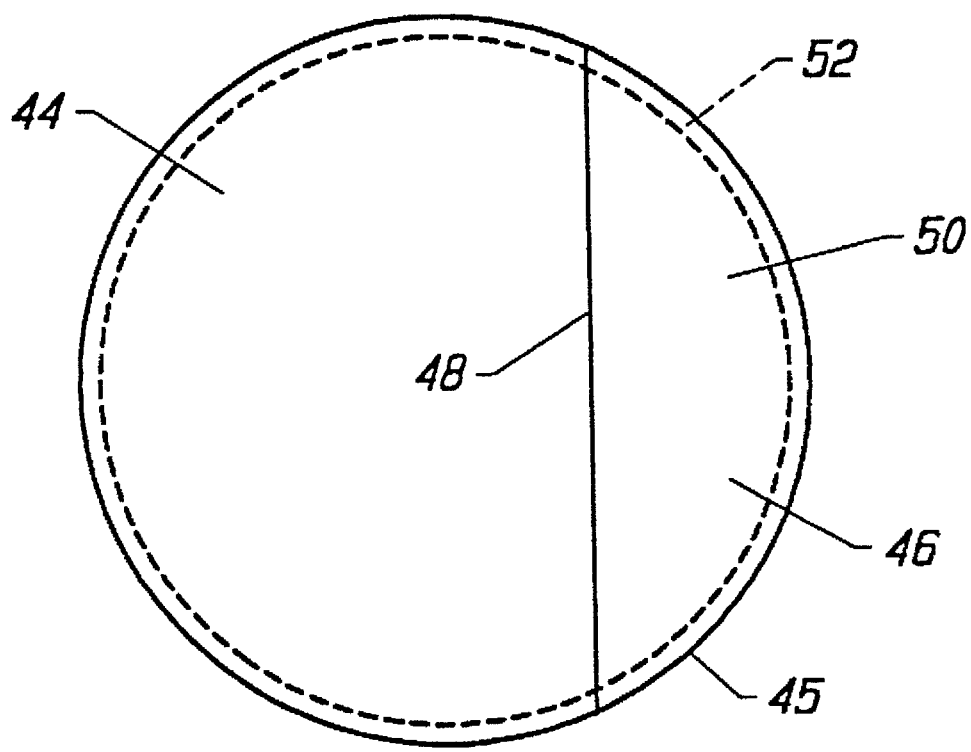
FIG. 5 is a top plan view of the spring biased plate of the vending apparatus of FIG. 1.

Referring to FIGS. 4 and 5, it can be seen that the plate 42 includes first portion 44 and second portion 46, joined in angular relation such that the intersection of portions 44, 46 forms a peak 48. This configuration of the plate 42 facilitates movement of the tray 12 from the open position to the closed position. As the tray 12 pivots into its closed position, the force exerted by tray 12 against ramped top surface 50 of first portion 46 has a downward component urging plate 42 downward (overcoming the upward spring force of springs 40).

The plate 42 has a circular perimeter 45 (FIG. 5) and a downwardly extending rim 52 (best shown in FIG. 4). As shown in FIG. 3A, rim 52 helps to stabilize the plate 42 against the bottom wall 17 of the housing 10 when the springs 40 are compressed.

As can be seen in FIG. 4, cylindrical wall 18 has two thicknesses: a greater thickness at portion 54, which is above the horizontal plane containing slot 34, and a smaller thickness at portion 56 which is below the horizontal plane of the slot 34. The thicker portion 54 of wall 18 helps to keep the disks centered above the recessed portion 24 of the tray 12 so that the bottom most disk 200 can fall directly into the recessed portion 24 (see FIG. 3A) when the tray 12 is in the fully closed position.

A substantially vertical pin hole 30 is formed in thicker portion 54 of the wall 18 as shown in FIG. 4. A second pin hole 51 is formed in wall 17 and is positioned in vertical alignment with the hole 30. The pin holes 30, 51 are located such that they are vertically aligned with the pin hole 32 of tray 12 (FIG. 2A) when the tray is in the closed position shown in FIG. 3A.

The tray 12 is provided with an electric latch (not shown in FIGS. 1 and 4) which is released upon application of a current pulse (which would occur following credit card verification). Upon release of the latch, the user retrieves the disk in recessed portion 24 of tray 12 by pulling the tray into its open position using the handle 23 (FIG. 1).

One such latch device is shown in FIGS. 3A and 3B and is designated generally as 31. A solenoid housing 37 is secured to wall 17 of the cylindrical housing 10. A solenoid 39 is mounted within the solenoid housing 37, and a magnetically conductive plunger 41 is slidably positioned within the solenoid 39. A spring 43 is also positioned within the solenoid 39, adjacent to the plunger 41.

The plunger 41 has a plunger tip 47 extending partially into interior 11 of the housing 10, through hole 51 (best shown in FIG. 4) in wall 17. The plunger tip 47 is sized for mating engagement with the pin hole 33 in the tray 12 when the tray is in the fully closed position.

The spring 43 biases the plunger 41 upwardly towards the housing 10. When the tray 12 is in the fully closed position and the solenoid 39 is not energized, the plunger tip 47 extends through the pin hole 33 and into the hole 30 in wall 18 to latch the tray 12 in the closed position.

Upon energization of the solenoid 39, the plunger 41 moves in a downward direction (against the spring 43), causing the plunger tip 47 to disengage from the hole 33 in the tray 12 to release the tray so that a user can swing the tray to the open position using the handle 23 (see FIG. 1). The solenoid 39 remains energized for a predetermined period of time, which is calculated to give the user sufficient time to remove the disk from the tray 12 and to push the tray 12 to the closed position. Upon de-energization of the solenoid 39, the spring 43 pushes the plunger 41 towards the housing 10 to re-position the plunger tip 47 in the holes 30, 33.

The magnetic card reader 14 (FIG. 1) is of the conventional type comprising a housing 13 which houses a magnetic read head (not shown) for reading information stored on a magnetic stripe on a credit card, debit card, library card, or the like. A user passes the card through a slot 15 formed in the side of the housing 13 and the magnetic stripe on the card is read by the magnetic read head. Information retrieved by the magnetic card reader 14 may be stored in a memory device (not shown) coupled to the credit card reader, or it may be verified using a modem (not shown) and communications software in a manner that is conventional with respect to credit and debit card transactions. It should be appreciated that the vending unit may alternatively be provided with a bar code reader or any other device capable of reading information from a card. It should also be appreciated that the apparatus may also be provided with conventional means for receiving cash payment in the form of bills or coins.

Operation of the vending apparatus of the first embodiment is initiated upon insertion of a card into the card reader slot 15; the insertion of the card is sensed by a switch inside the slot 15 and is interpreted by a controller to be a dispensing request. The credit card information is verified and, once approval is received, the controller delivers a current pulse to the latch to release the tray 12.

Figure 6:
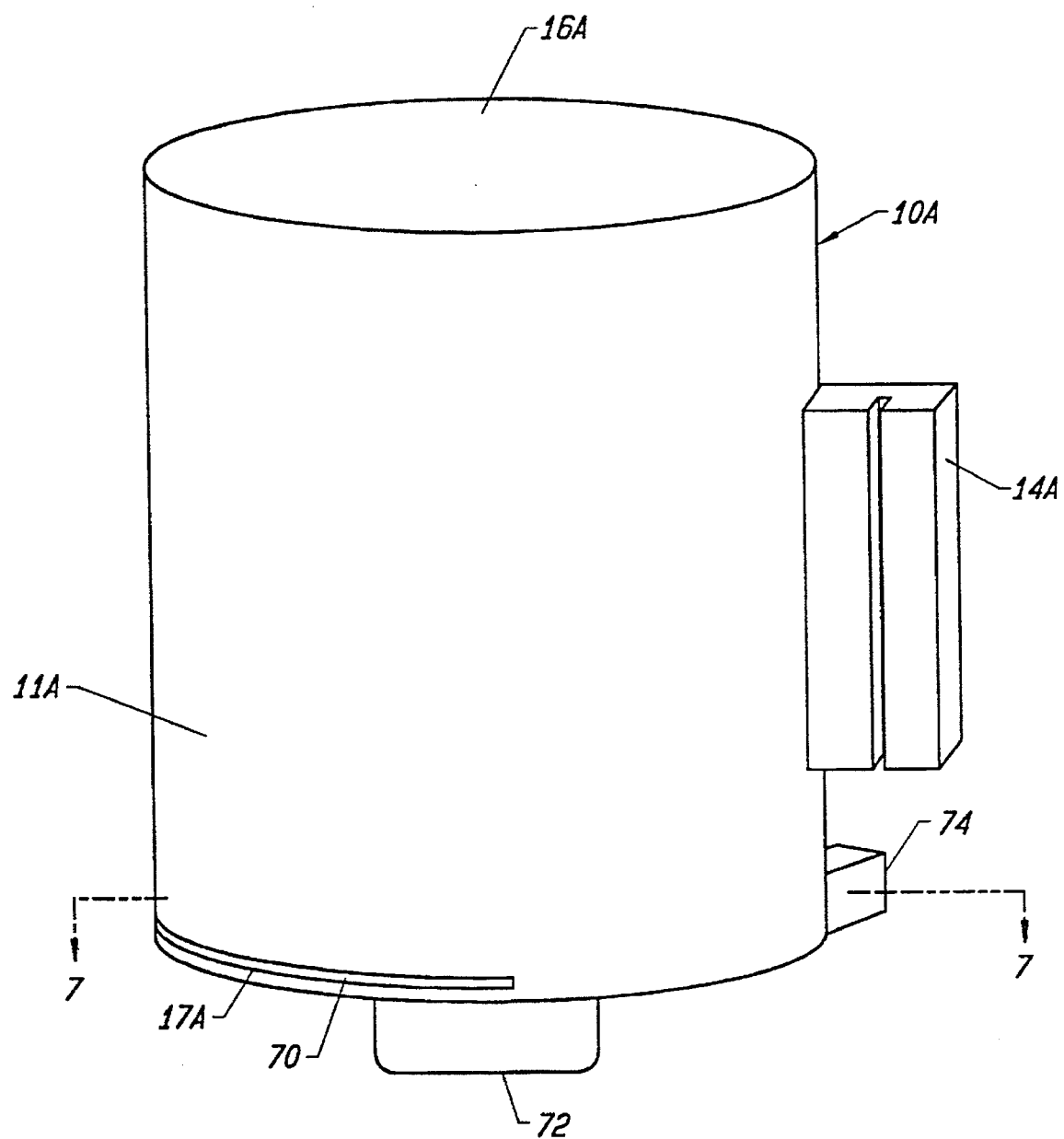
FIG. 6 is a perspective view of a second embodiment of a vending apparatus according to the present invention.
Figure 7:
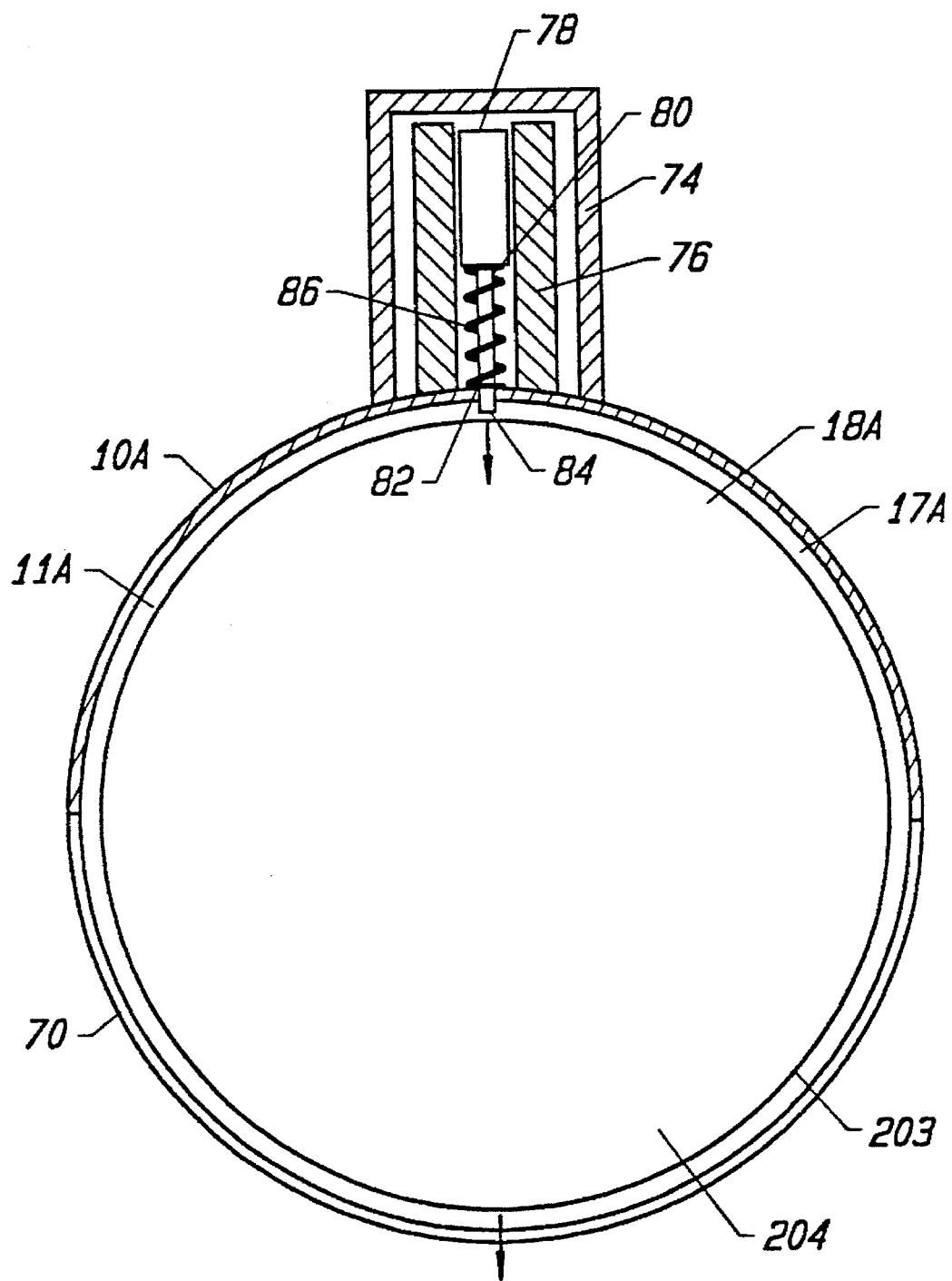
FIG. 7 is a top section view of the vending apparatus of FIG. 6, taken along the plane designated 7—7 in FIG. 6.

A second embodiment of a disk vending machine is shown in FIGS. 6 and 7. The second embodiment is comprised of a cylindrical housing 10a, a credit card reader 14a (of the type described above) and a slot 70 through which disks are dispensed.

The cylindrical housing 10a has a top wall 16a and a bottom wall 17a which have circular perimeters and which are parallel to each other. The walls 16a, 17a are substantially horizontal, and are fixedly connected to each other by a substantially vertical wall 18a. A housing 72 which houses a rotating magnetic write head (not shown) is secured to bottom wall 17a.

Slot 70 is preferably oriented substantially horizontally and is adjacent to bottom wall 17a of cylinder 10a. It is sized to permit passage of a disk through it from the interior 11a to the exterior of the housing 10a. In the second embodiment, a disk is ejected through the slot 70, by means of a spring loaded solenoid. Referring to FIG. 7, a solenoid housing 74 is fixedly attached to outer wall 18a of housing 10a and a solenoid 76 is positioned within the housing. A plunger 78 is longitudinally slidable within the solenoid windings, in a direction normal to the wall 18a. The plunger 78 is made of iron or other magnetically conductive material.

Extending longitudinally from the plunger 78 is a thrusting pin 80 which extends through a hole 82 in the wall 18a. Tip 84 of thrusting pin 80 is positioned slightly to the interior 11a of the cylinder 10a. A spring 86 is disposed around the thrusting pin 80, outside the wall 18a.

Ejection of a disk through slot 70 occurs upon application of a pulse of current to the windings of solenoid 76 to induce a magnetic field within the solenoid. The current must be of a polarity which will generate a magnetic field that will compel movement of the magnetically conductive plunger 78 towards the housing 10a. The magnetic field generated within the solenoid causes the plunger 78 to move longitudinally within the solenoid windings, causing the tip 84 of thrusting pin 80 to advance further into the interior 11a of the cylindrical housing 10a. The tip 84 collides with a circumferential edge 203 of the lowest disk in a stack of disks inside the housing 10a and pushes the disk through the slot 70.

In the second embodiment, housing 72 attached to bottom wall 17a of the cylindrical housing 10a holds a rotatable magnetic write head (not shown) which is for recording transaction information (e.g. the user's credit card information, the transaction date, etc.) onto a region of magnetic material formed on the surface of a disk.

Figure 8A:
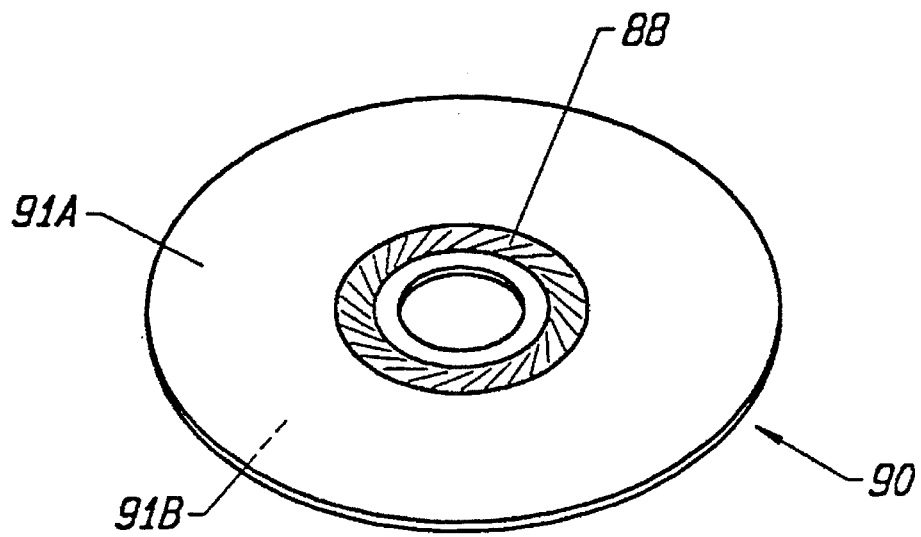
FIGS. 8A is a perspective view of a disk according to the present invention.
Figure 8B:
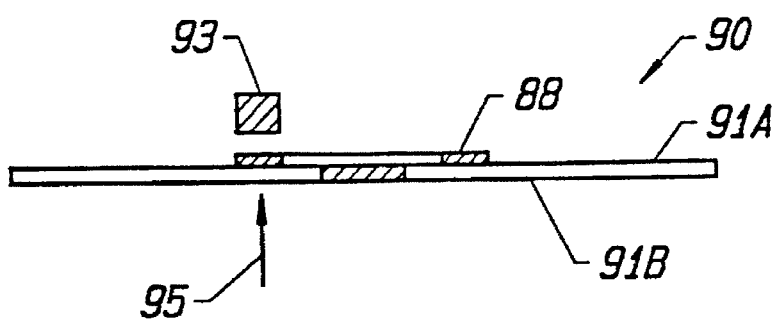
FIG. 8B is a side view of the disk of FIG. 8A, showing schematically the direction from which an optical head would read the optical portion of the disk and schematically showing a magnetic head positioned above the magnetic portion of the disk.

Referring to FIGS. 8A and 8B, a disk 90 provided for use with the second embodiment has a region of magnetic material 88 which is preferably ring-shaped. The ring of magnetic material is formed on the side 91a of the disk 90 which normally holds a disk label and which is opposite from the side 91b of the disk which is read by a optical disk reader inside a CD player. In FIG. 8B, the direction from which a CD player normally reads a disk is indicated by arrow 95. Magnetic read head 93 (of FIG. 8B) is positioned within a disk player to read transaction data prerecorded on ring 88.

For the purposes of storing transactional information such as credit card data and, the date and time of the transaction, a single track on the magnetic ring (as opposed to multiple tracks as are found on floppy disks) will provide sufficient data storage space. The ring 88 is preferably formed on the side of the disk which bears the disk label so that it will not prevent normal reading of the optically stored data on the disk. The magnetic write head within housing 72 may be a conventional head of the type used to record information onto floppy disks. Unlike a conventional floppy disk drive, which rotates the disk, the drive head of the present invention is itself rotated to move along the magnetic stripe. Since the ring 88 of magnetic material has only a single track, the preferred drive head need not be moveable in a radial direction.

Figure 9A:
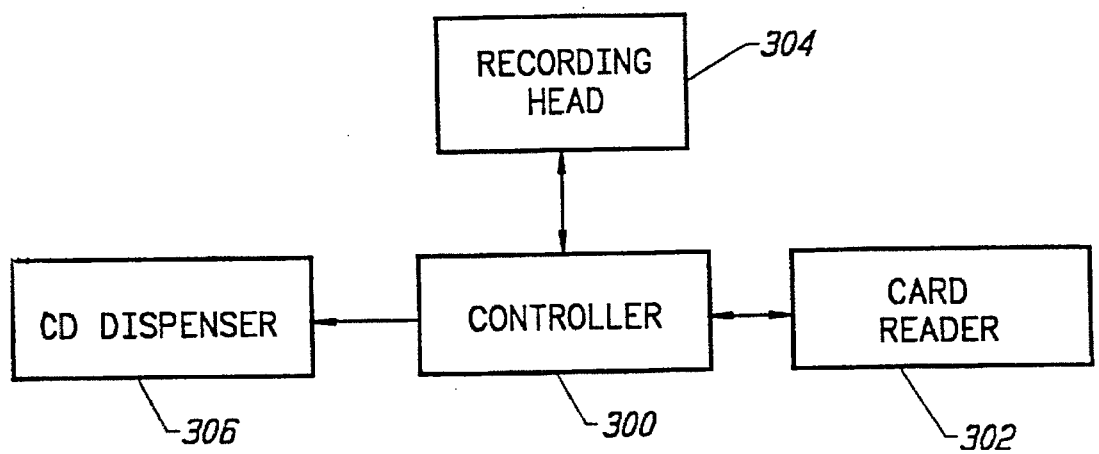
FIG. 9A as a simplified schematic representation of a system including the vending apparatus of FIG. 6.

A simplified schematic representation of the second embodiment of the present invention is shown in FIG. 9A. A controller 300 (not shown in FIGS. 6–7) is communicatively coupled to the card reader 302 within reader assembly 14. Magnetic recording head 304 (within housing 702) is driven by the controller 300. The CD dispenser 306 (the spring loaded solenoid 76 of FIG. 7) is also electrically driven by the controller 300. The controller 300 preferably has an internal timer which keeps track of the date and time.

Figure 9B:
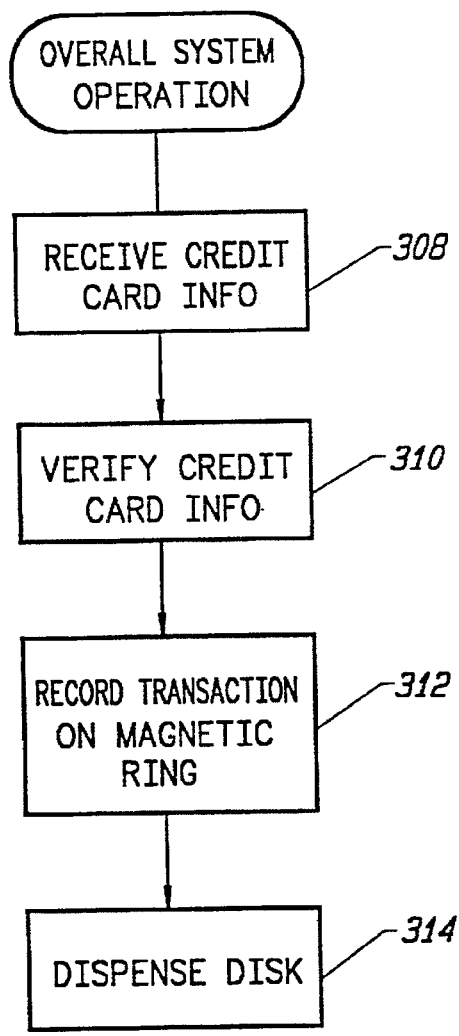
FIG. 9B is a simplified flow diagram illustrating operation of the system of FIG. 6.

FIG. 9B shows a simplified flow diagram of the FIG. 9A system. As described above, the system may be adapted to receive and process credit or debit card information or other information such as a library user information or student identification information. For simplicity, operation of the system will be described with respect to credit card payment for a disk rental.

At steps 308 and 310, credit card information is received and verified (by controller 300 and/or remote means in communication with controller 300). Transactional information, such as the user's credit card information and the date and time of the transaction is next (during step 312) recorded by the magnetic head 304 onto the magnetic ring 88 on the disk. Next, at step 314, the CD is dispensed to the user.

Figure 10:
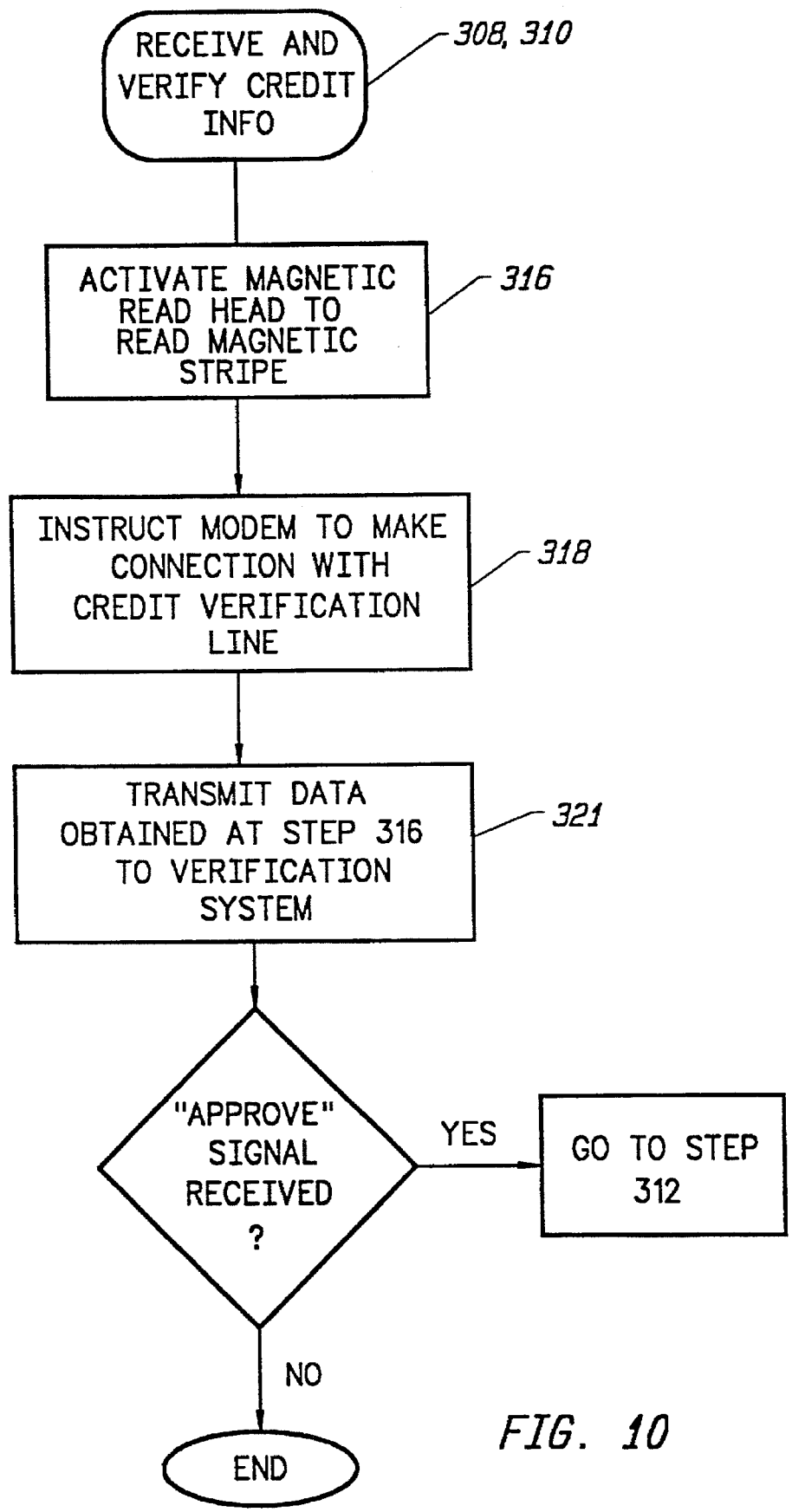
FIG. 10 is a simplified flow diagram illustrating the credit card receipt and verification procedure of the system of FIG. 6.

The credit information receipt and verification procedures, steps 308, 310, are shown in the simplified flow diagram of FIG. 10. The credit card number and expiration date, which are digitally stored on the magnetic stripe on the back of the credit card are read during step 316 by the credit card reader 302 (designated 14a in FIG. 6). A modem and communications software (not shown) are next used to dial into and establish communication with an off-site credit card verification system at step 318. Once communication with the verification system is established, the expiration date and credit card number are transmitted to the off-site verification system at step 321, and approval is awaited, step 322. If approval is received, the system proceeds with step 312, during which transaction information (i.e. date and time of transaction and user's name and credit information) is recorded onto the magnetic ring 88 on the bottom-most disk in the stack of disks inside the vending machine. If approval is not received, no disk is dispensed.

Figure 11:
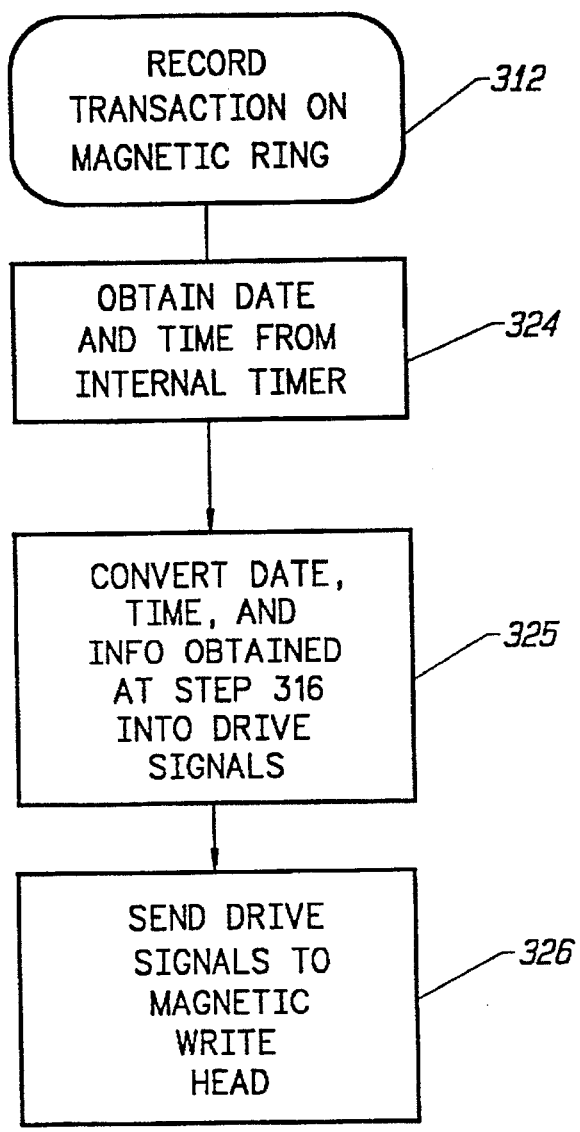
FIG. 11 is a simplified flow diagram illustrating the transactional information recording procedure of the vending apparatus of FIG. 6.
Figure 12:
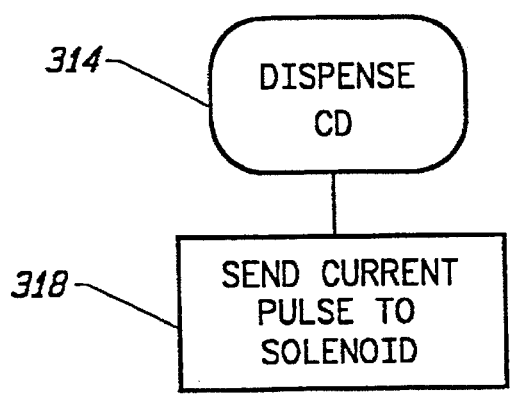
FIG. 12 is a simplified flow diagram illustrating the disk dispensing procedure of the vending apparatus of FIG. 6.

FIG. 11 is a simplified flow diagram illustrating the procedure of recording a transaction on the bottom-most disk's magnetic ring. The date and time of the transaction are retrieved from the internal timer (within controller 300) at step 324 and are convened to drive signals at step 325. At step 326, the magnetic recording head (304) is activated to record the date and time information, as well as the credit card payment information, onto the circular magnetic ring on the disk. This information may also be written to an internal memory location within the vending machine (e.g., within controller 300). Referring now to FIG. 12, once the recording procedure of step 326 is completed, the controller directs the delivery of a current pulse to the solenoid to eject the disk, step 328.

The vending machine of the second embodiment is suitable for placement in a number of locations. For example, the vending machine may be placed in an airline terminal or on an airplane so as to make disks available for passenger use with in-flight entertainment systems. The vending unit may be positioned beside a locked return receptacle which has a slot sized to receive returned disks. Disks may be retrieved daily from the return receptacle by an airline employee, who may then use a magnetic reading device to read the information written to the magnetic ring during step 326 and to bill the user's credit card for the period of time for which the user was in possession of the disk. The return receptacle may alternatively be provided with a magnetic read head which can automatically retrieve the user information from the circular magnetic ring and which can transfer the information electronically to a billing network.

A third embodiment of a disk vending machine will be described with reference to FIGS. 13–17. This embodiment is a multiple selection vending machine, which offers a purchaser or a renter two or more disk selections. It is comprised generally of a cylindrical housing 100 (shown in FIG. 13) having a plurality of dispensing slots 102. The slots 102 are sized to allow ejection of selected disks through them. A user input device 101 having a keypad 103, video (or other) display 105, and credit card reader 107 is coupled to a vending unit processor (not shown) and allows a user to provide credit card information and to select one of the offered disk types.

Figure 14:
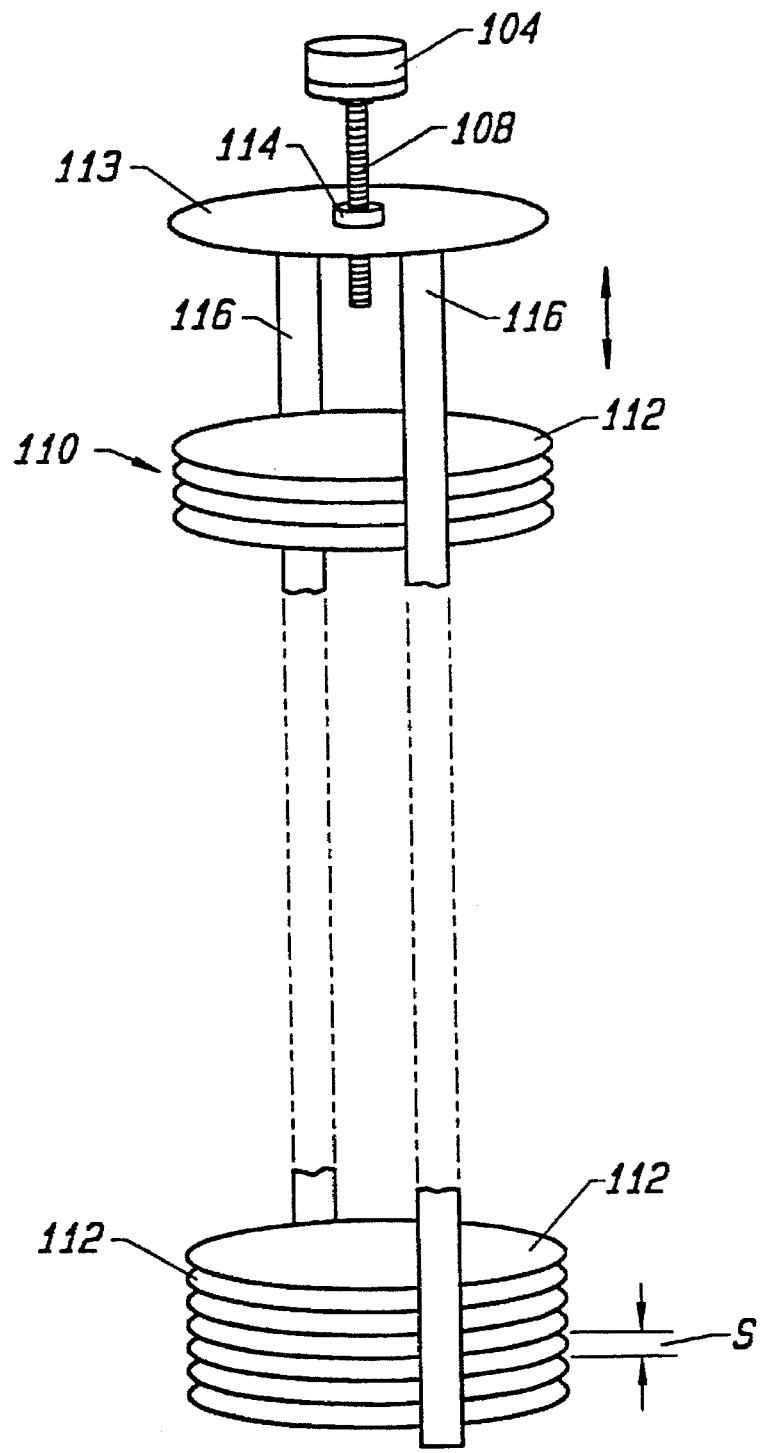
FIG. 14 is a perspective view of the disk carriage of the vending apparatus of FIG. 13.

Referring to FIG. 14, a stepping motor 104 is mounted within the cylindrical housing 100. The stepping motor 104 is coupled to lead screw 108 which extends longitudinally within a portion of cylindrical housing 100. A disk carriage 110 is coupled to lead screw 108 by means of a lead screw nut 114 fixed to a top plate 113 of the carriage such that, upon activation of the stepping motor 104, the resultant rotational movement of the lead screw 108 is translated to linear movement of the carriage 110 by means of the lead screw nut 114.

The carriage 110 is comprised of a pair of parallel elongate rods 116 and has a plurality of parallel disk storage shelves 112. The top plate 113 and the storage shelves 112 are disk-shaped and are fixedly attached at their perimeters to rods 116, preferably such that the rods 116 are separated 180° from each other along the perimeters. The shelves 112 are spaced from each other by a separation distance S which must be at least great enough to allow a disk to be carried on each shelf 112.

During use, the stepping motor is activated (in accordance with a selection made by the user) to position a disk of the selected type into a position from which it can be ejected through one of the slots 102 in the cylindrical housing 100. Ejection of a disk may be effected using an ejection device similar to the spring loaded solenoid configuration shown in FIG. 7 and described with respect to the second embodiment.

Figure 15:
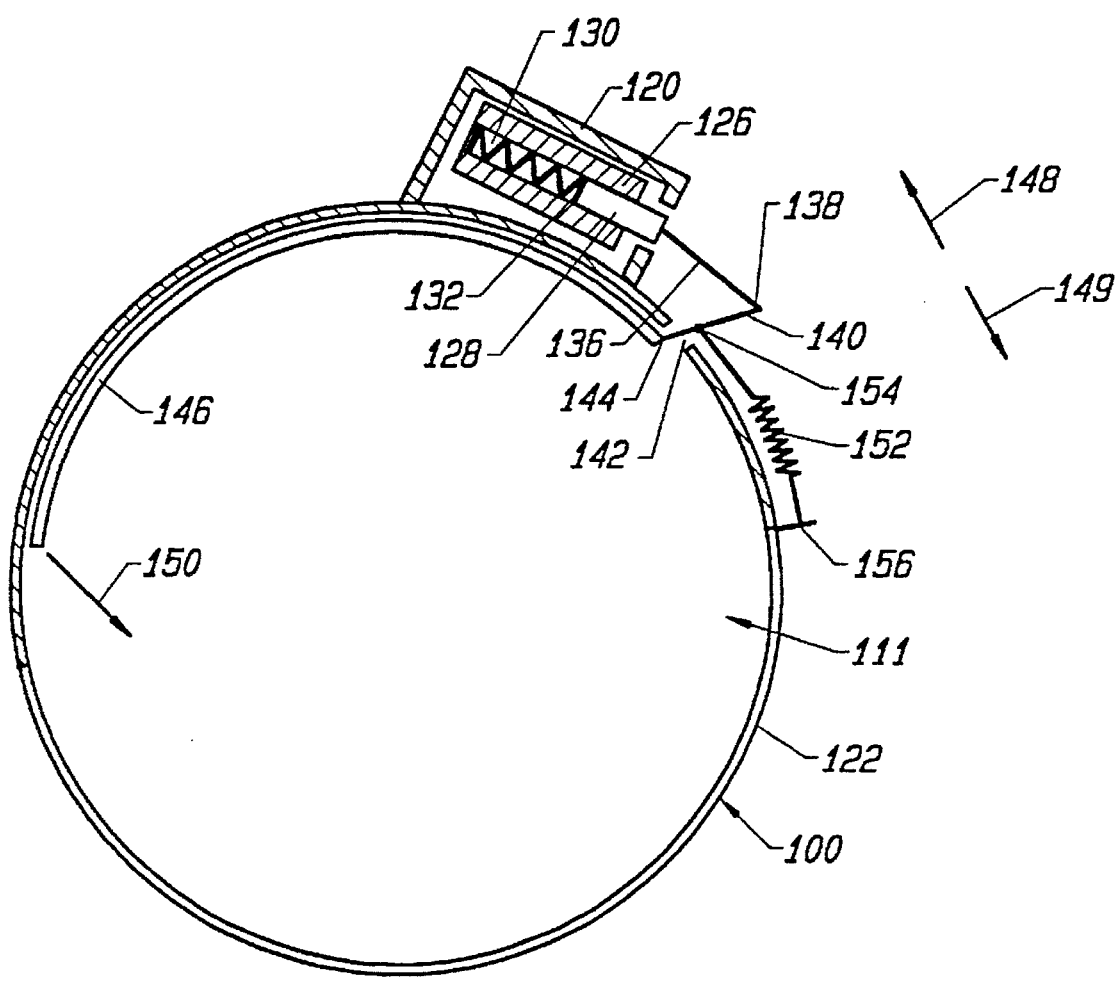
FIG. 15 is a top section view of the vending apparatus of FIG. 13 taken along the plane designated 15—15 in FIG. 13.

An alternative solenoid-type ejection device is illustrated in FIG. 15. A solenoid housing 120 is secured to wall 122 of the cylindrical housing 100 and has an opening 124. A solenoid 126 is within the solenoid housing. As with the solenoid configuration of the second embodiment, a magnetically conductive plunger 128 is positioned within the solenoid 126. A spring 130 is also positioned within the solenoid 126, adjacent to the plunger 128.

The plunger 128 has a first end 132 and a second end 134. First end 132 is adjacent to the spring 130. Second end 134 of the plunger 128 is adjacent to the opening 124. The plunger 128 is slidable longitudinally within the solenoid 126.

A cable 136 is fixed to second end 134 of plunger 128. Cable 136 has a first end 138 that is fixed to a wire 140. Wire 140 extends into the interior 111 of the housing 100 through a slot 142 in the wall 122. End 144 of wire 140 is secured to an arcuate arm 146, at the interior 111 of the cylindrical housing 100. End 144 is pivotally secured within slot 142 such that when wire 140 is pivoted around end 144 in the direction indicated by arrow 148, the arm 146 pivots around end 144 in the direction indicated by the arrow designated 150.

A spring 152 has a first end 154 attached to wire 140 and a second end 156 attached to the wall 122 at the exterior of the cylindrical housing 100. The spring 152 biases wire 140 in the direction indicated by the arrow 149 so that the arm 146 is at rest when in the position shown in FIG. 15.

Each slot 102 (FIG. 13) has a corresponding ejection device of the type described. Movement of one of the shelves 112 (FIG. 14) into a position adjacent to one of the slots 102 moves the disk on that shelf into a position in which the arm 146 of the ejection device corresponding to the adjacent slot extends around the disk's perimeter.

Figure 13:
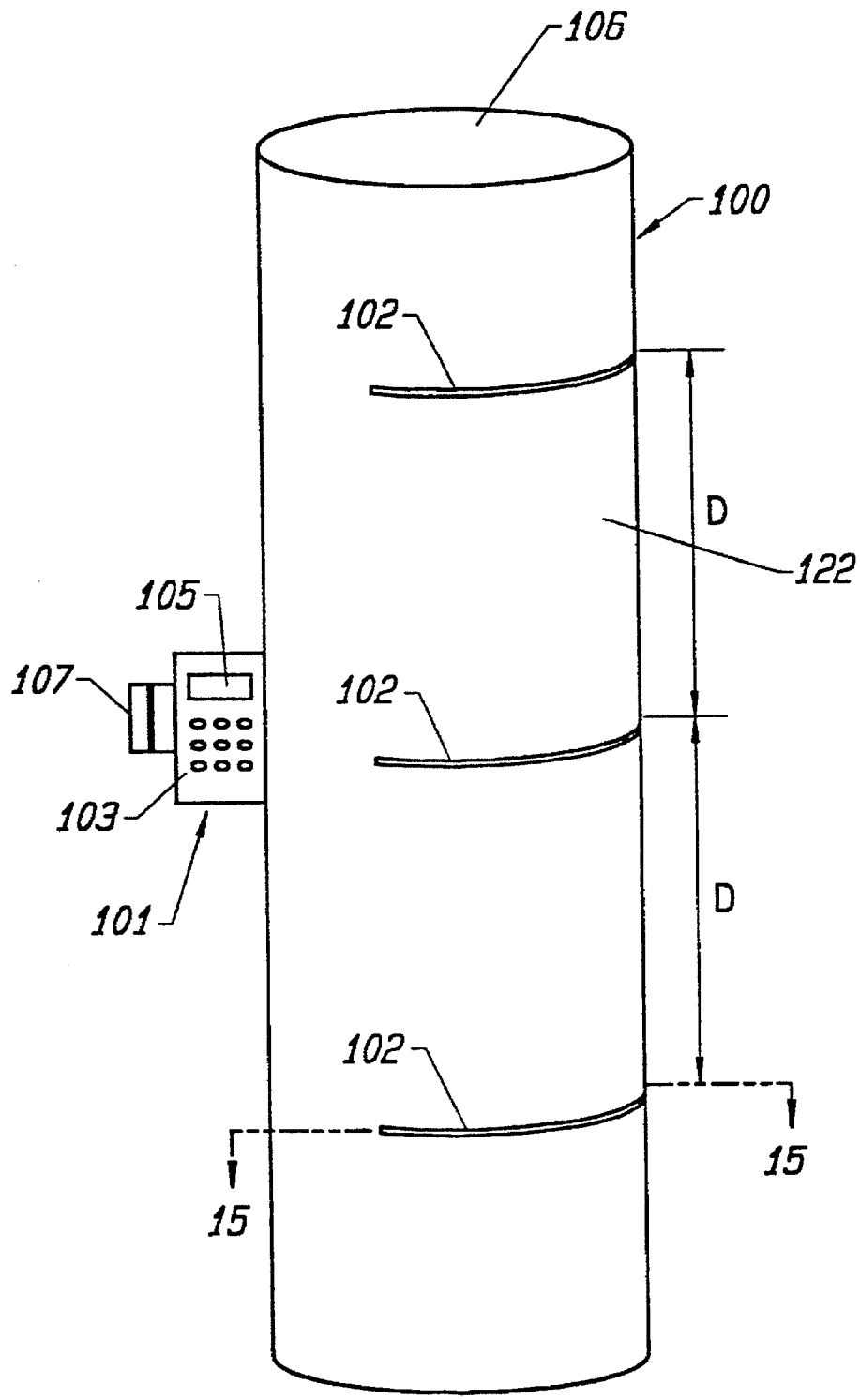
FIG. 13 is a perspective view of a vending apparatus according to the third embodiment.

Once the selected disk is positioned adjacent to its nearest slot, a pulse of current is applied to the corresponding solenoid 126. Upon energization of the solenoid 126, the plunger 128 slides within the solenoid 126, away from the opening 124, in response to a magnetic field generated within the solenoid housing. Movement of plunger 128 pulls cable 136 and therefore pivots wire 140 about its end 144. This in turn causes the arm 146 to pivot in the direction of arrow 150 and to therefore push a disk adjacent to it out through the adjacent dispensing slot 102 (FIG. 13). When current flow through the solenoid 126 is terminated, the magnetic force inside the solenoid 126 dissipates and the tension on the cable 136 is relieved. Wire 140 pivots around its end 144 in the direction of arrow 149 by virtue of the spring force delivered by spring 152.

The separation distance S between the shelves 112 on the carriage 110 must be set to ensure that only one disk can be ejected from the vending machine at one time. In other words, the shelf intervals and the distances between the slots 102 should be calculated such that when one disk is positioned adjacent to a slot 102 no other disks are positioned adjacent to the remaining slots 102. The distance D between each slot 102 may be calculated as follows:

$$D = (n_{CD}/3 + \tfrac{1}{3}) \times S$$

where $n_{CD}$ equals the total number of disks which can be stored on the carriage 110 and where S equals the interval between two consecutive shelves 112.

Figure 16:
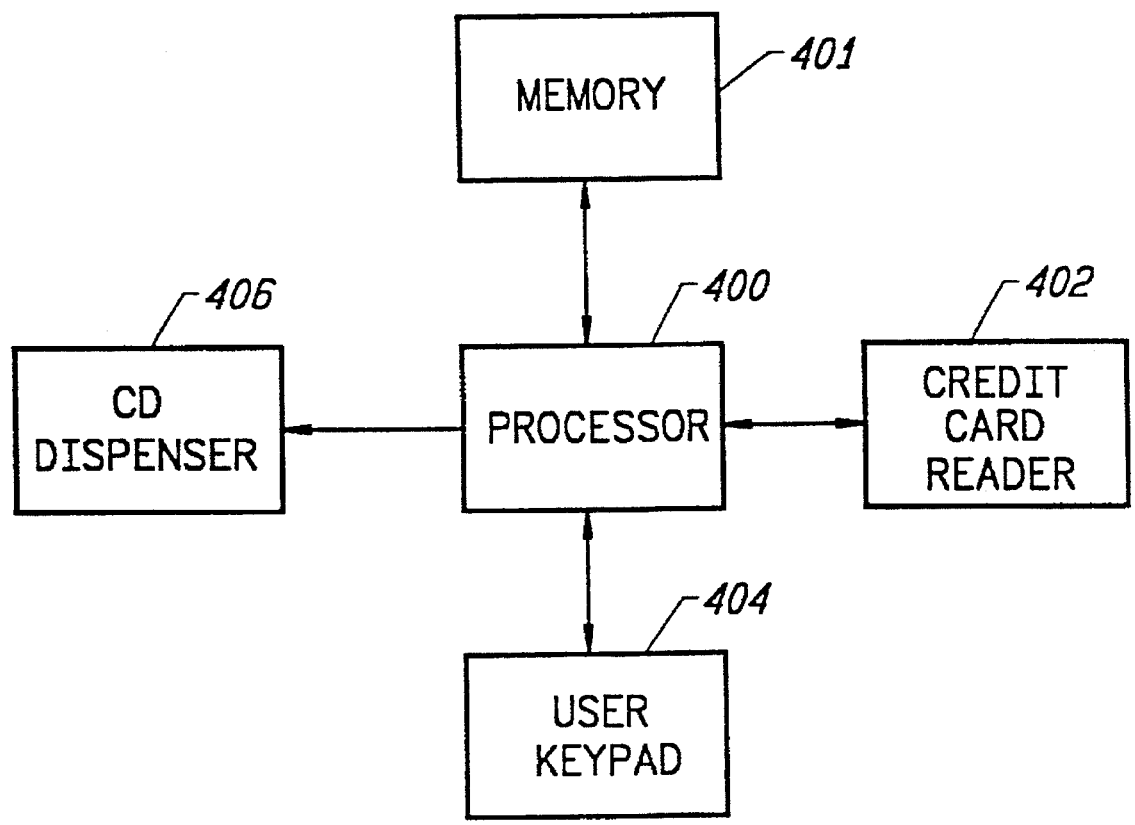
FIG. 16 is a simplified schematic representation of the system of the vending apparatus of FIG. 13.

FIG. 16 is a simplified schematic representation of the system according to the third embodiment. A processor 400 (within device 101) controls the credit card reader 402 (designated 107 in FIG. 13) and the user keypad and display 404 (103 and 105, respectively, in FIG. 13). It also controls the disk dispenser 406 (the stepper-driven carriage 110 of FIG. 14 and the solenoid-controlled ejection device of FIG. 15) which dispenses a selected disk to the user.

A memory 401 stores tables corresponding to the types of disks offered for selection by the user and the shelf locations of the disks of each type. The memory 401 includes an inventory memory location which, following each transaction, is updated to reflect that a disk has been dispensed from a particular shelf location.

The inventory memory may be replaced by a conventional infrared emitter/detector pair positioned to sense the presence or absence or disks on the shelves.

Figure 17:
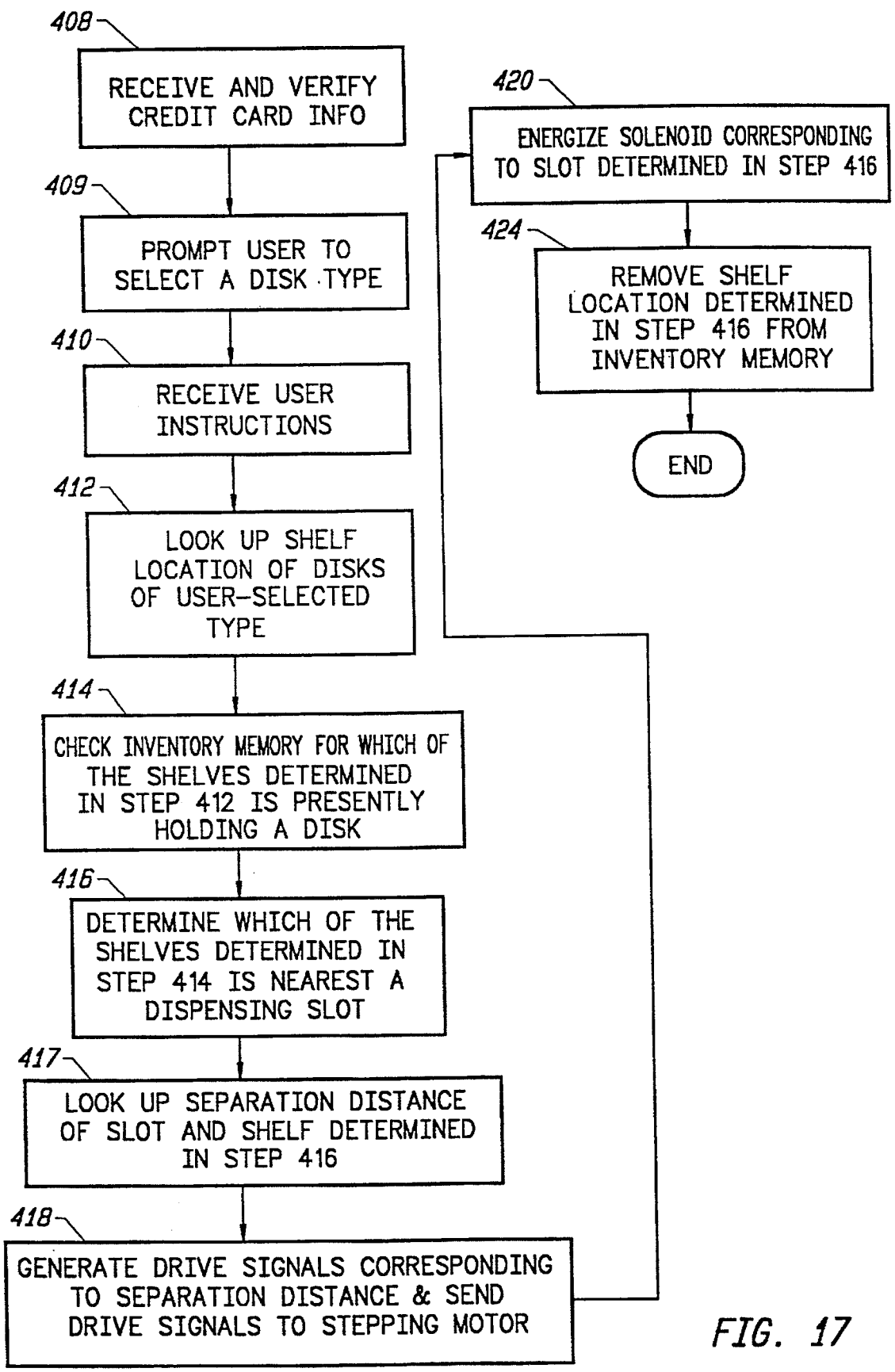
FIG. 17 is a simplified flow diagram illustrating operation of the vending apparatus of FIG. 13.

Referring to the simplified flow diagram of FIG. 17, at step 408 the processor receives and verifies credit card information in the way described with respect to the second embodiment. Next, at steps 409 and 410, the user is prompted to enter a selected disk type into the keypad, and these user instructions are received by the processor. Using a look up table, the processor determines which of the shelves (designated 112 in FIG. 14) store disks of the type selected by the user, step 412. The processor next determines, using information stored in an inventory memory location, which of the shelves determined in step 412 is presently holding a disk, step 414.

At step 416, the processor determines which of the shelves determined in step 414 is nearest to a dispensing slot. At step 417, the separation between the disk and the associated disk dispensing slot is determined.

The processor next generated drive signals corresponding to the separation distance determined in step 417, and those drive signals are sent to the stepping motor at, step 418. In accordance with the drive signals, the stepping rotates through the proper number of steps to position the shelf into alignment with the slot determined in step 416. In step 420 the solenoid is energized to dispense the disk, and in step 424 the inventory memory is updated to reflect that the disk was dispensed from its respective shelf.

The vending machine of the third embodiment is especially suitable for the sale of disks. It may also be provided with a memory location for storing transactional information such as the date and time of the transaction and the user's credit information, so that the user may be billed upon return of the disk or charged for an unreturned disk.

The concept described above of providing optical disks having a ring of magnetic storage media attached to them has many applications other than use for distribution by disk vending machines. For example, CD ROM players equipped with magnetic heads may be provided such that the optically stored information on a disk can be read conventionally from one side (side 91b shown in FIG. 8B) of the disk using a laser, and such that magnetically stored information can be written to and retrieved from the opposite side of the disk (side 91A) using the magnetic head. In such a CD player, the magnetic head (shown schematically and designated 93 in FIG. 8B) might be spring loaded to press against the magnetic ring when the disk is closed inside the CD player. The structure used to rotate the disk during optical reading operations could also be used to rotate the disk for magnetic read and write operations.

The magnetic storage portion of a disk of this type can be made to store instructions as to how the optically stored information on the disk should be manipulated by the CD player. For example, the optical storage portion of the disk could be used to store personal photos or video segments, and the magnetic storage portion of the disk could be used to specify the display sequence of the photos or video segments or to instruct the CD player on matters such as segment-to-segment transitions, image scrolling or special effects.

While special equipment is needed to place to optically stored data onto compact disks, magnetic instructions stored on disks of the type described can be created and modified at home by consumers. The magnetic portion of the disks may be provided with a single track or with multiple tracks. If multiple tracks are provided, the CD player would be provided with a magnetic head constructed for radial movement over the magnetic surface of the disk.

A magnetic storage portion on an optical storage disk could also be used for educational multimedia purposes. For example, a student's progress through a number of optically-stored lessons on a CD could be tracked on the writable magnetic portion of the disk.

The present invention has been described with respect to three embodiments. However, it should be appreciated that these embodiments are provided in an exemplary sense, rather than in a limiting sense.

I claim:

1. An automated vending apparatus for digital storage dish, comprising:

a body having a chamber sized for storing a plurality of disks positioned parallel to each other within the chamber, the chamber having at least one disk ejection location, the body including a base, and a wall surrounding the base, the wall having at least one slot adjacent to the disk ejection location and sized to allow passage of a disk through it;

a disk carriage having a plurality of disk storage locations, the carriage longitudinally moveable within the chamber;

user interface means for receiving a disk dispensing request from a user;

control means responsive to the disk dispensing request for generating dispensing control signals; and dispensing means responsive to the dispensing control signals for moving the disk carriage to position one of the disk storage locations in the disk ejection location and for dispensing a disk from the disk ejection location through the slot.

2. An automated vending apparatus for digital storage disks, comprising:

a body having a chamber sized for storing a plurality of disks positioned parallel to each other within the chamber, the chamber having at least one disk ejection location, the body including a base, and a wall surrounding the base, the wall having at least one slot adjacent to the disk election location and sized to allow passage of a disk through it;

a disk carriage having a plurality of disk storage locations, the carriage longitudinally moveable within the chamber;

user interface means for receiving a disk dispensing request from a user;

control means responsive to the disk dispensing request for generating dispensing control signals; and dispensing means responsive to the dispensing control signals for moving the disk carriage to position one of the disk storage locations in the disk ejection location and for dispensing a disk from the disk ejection location through the slot;

wherein the dispensing control signals include carriage position control signals corresponding to the disk storage location to be positioned in the disk ejection location, and wherein the dispensing means includes a motor responsive to the carriage position control signals, the motor coupled to the disk carriage for movement of the disk carriage longitudinally within the chamber.

3. The vending apparatus of claim 2 wherein the user interface means is further for receiving from the user a selection command corresponding to a selected disk type, and wherein the carriage position control signals generated by the control means correspond to a disk storage location storing a disk of the selected type.

4. The vending apparatus of claim 2 wherein the wall has a hole adjacent to the disk ejection location, and wherein the dispensing control signals include ejection control signals, and wherein the dispensing means includes:

a solenoid mounted to the wall and configured for receiving current pulses corresponding to the ejection control signals and for producing a magnetic field upon receipt of said current pulses;

a pivot arm extending through the hole in the wall, the pivot arm having a first end portion positioned inside the chamber, an intermediate portion pivotally mounted within the hole, and a second end portion positioned outside the chamber;

a magnetically conductive plunger at least partially disposed within the solenoid, the plunger joined in angular relation to the second end portion of the pivot arm, the plunger slidable within the solenoid in response to the magnetic field to pivot the pivot arm about the intermediate portion; and an ejection arm connected to the first end portion of the pivot arm for pivotal movement therewith, the ejection arm positioned adjacent to the disk ejection location for engagement with a disk positioned at the disk ejection location such that pivotal movement of the ejection arm pushes the disk through the slot.

\* \* \* \* \*

UNITED STATES PATENT AND TRADEMARK OFFICE
CERTIFICATE OF CORRECTION

PATENT NO. : 5,641,092
DATED : June 24, 1997
INVENTOR(S) : ED SCOTT

It is certified that error appears in the above-indentified patent and that said Letters Patent is hereby corrected as shown below:

Column 10, line 30, "dish" should be --disks--.

Signed and Sealed this

Twenty-fifth Day of November, 1997

Attest:

BRUCE LEHMAN

Attesting Officer

Commissioner of Patents and Trademarks